United States Patent
Wang et al.

(10) Patent No.: US 9,974,052 B2
(45) Date of Patent: May 15, 2018

(54) CELL AND METHOD AND SYSTEM FOR BANDWIDTH MANAGEMENT OF BACKHAUL NETWORK OF CELL

(71) Applicant: Industrial Technology Research Institute, Hsinchu (TW)

(72) Inventors: Chun-Chieh Wang, Kaohsiung (TW); Kuei-Li Huang, Kaohsiung (TW); Mu-Liang Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 128 days.

(21) Appl. No.: 14/979,562

(22) Filed: Dec. 28, 2015

(65) Prior Publication Data
US 2017/0064674 A1 Mar. 2, 2017

(30) Foreign Application Priority Data
Aug. 27, 2015 (TW) .............................. 104128094 A

(51) Int. Cl.
*H04W 4/00* (2018.01)
*H04W 72/04* (2009.01)
(Continued)

(52) U.S. Cl.
CPC ............. *H04W 72/04* (2013.01); *H04L 45/64* (2013.01); *H04L 45/745* (2013.01);
(Continued)

(58) Field of Classification Search
CPC ..... H04W 72/04; H04W 76/02; H04W 40/02; H04L 61/2007; H04L 45/745
(Continued)

(56) References Cited
U.S. PATENT DOCUMENTS 8,185,617 B1    5/2012 Mukerji
8,711,855 B1    4/2014 Murphy et al.
(Continued)

FOREIGN PATENT DOCUMENTS

| CN | 102638853 | 7/2014 |
| TW | 201145914 | 12/2011 |
| WO | 2010036535 | 4/2010 |

OTHER PUBLICATIONS

"Office Action of Taiwan Counterpart Application", dated Jun. 6, 2016, p. 1-p. 3.
(Continued)

Primary Examiner — Faisal Choudhury
(74) Attorney, Agent, or Firm — JCIPRNET

(57) ABSTRACT

A cell and a method and a system for bandwidth management of a backhaul network of the cell, adapted for arranging a routing path of a bearer established between a user equipment and a serving gateway through the cell in the backhaul network, are provided. In the method, the cell connects the user equipment to establish the bearer between the user equipment and the serving gateway or change an established bearer. The cell sets a packet label on the data packets of the bearer and transmits the packet label and bandwidth management information of the bearer to a controller of the backhaul network for the controller to arrange the routing path of the data packets using the packet label in the backhaul network according to the bandwidth management information.

20 Claims, 8 Drawing Sheets

(51) Int. Cl.
  *H04W 28/02* (2009.01)
  *H04W 40/22* (2009.01)
  *H04L 12/715* (2013.01)
  *H04L 12/741* (2013.01)
  *H04L 29/12* (2006.01)
  *H04W 40/02* (2009.01)
  *H04W 76/02* (2009.01)
  *H04L 12/723* (2013.01)

(52) U.S. Cl.
  CPC ..... *H04L 61/2007* (2013.01); *H04W 28/0247* (2013.01); *H04W 40/02* (2013.01); *H04W 40/22* (2013.01); *H04W 76/02* (2013.01); *H04L 45/50* (2013.01)

(58) Field of Classification Search
  USPC ............................................................ 370/329
  See application file for complete search history.

(56) References Cited

U.S. PATENT DOCUMENTS

| | | | |
|---|---|---|---|
| 8,762,501 B2 | 6/2014 | Kempf et al. | |
| 8,867,361 B2 | 10/2014 | Kempf et al. | |
| 8,873,398 B2 | 10/2014 | Kempf et al. | |
| 8,971,339 B2 | 3/2015 | Ueno | |
| 2010/0159991 A1 | 6/2010 | Fu et al. | |
| 2012/0113989 A1 | 5/2012 | Akiyoshi | |
| 2012/0294163 A1* | 11/2012 | Turtinen | H04W 72/042 370/252 |
| 2012/0300615 A1 | 11/2012 | Kempf et al. | |
| 2012/0303835 A1 | 11/2012 | Kempf et al. | |
| 2013/0121207 A1 | 5/2013 | Parker | |
| 2014/0010207 A1* | 1/2014 | Horn | H04W 36/165 370/332 |
| 2014/0056130 A1 | 2/2014 | Grayson et al. | |
| 2014/0092765 A1 | 4/2014 | Agarwal et al. | |
| 2014/0126410 A1 | 5/2014 | Agarwal et al. | |
| 2014/0133456 A1 | 5/2014 | Donepudi et al. | |
| 2014/0219094 A1 | 8/2014 | Kampmann et al. | |
| 2014/0241247 A1 | 8/2014 | Kempf et al. | |
| 2014/0254373 A1 | 9/2014 | Varma | |
| 2014/0259012 A1 | 9/2014 | Nandlall et al. | |
| 2014/0328190 A1 | 11/2014 | Lord et al. | |
| 2014/0341131 A1 | 11/2014 | Jeon et al. | |
| 2014/0362790 A1 | 12/2014 | McCann | |
| 2015/0003435 A1 | 1/2015 | Horn et al. | |
| 2015/0055623 A1 | 2/2015 | Li et al. | |
| 2015/0063166 A1 | 3/2015 | Sif et al. | |
| 2015/0119050 A1* | 4/2015 | Liao | H04W 40/08 455/445 |
| 2015/0131535 A1* | 5/2015 | Wallentin | H04W 76/025 370/329 |
| 2015/0207677 A1* | 7/2015 | Choudhury | H04L 41/0806 370/254 |
| 2016/0007388 A1* | 1/2016 | Ianev | H04W 4/005 455/450 |
| 2017/0012956 A1* | 1/2017 | Lee | H04L 63/08 |
| 2017/0118795 A1* | 4/2017 | Guo | H04W 76/06 |

OTHER PUBLICATIONS

"Search Report of Europe Counterpart Application", dated Jan. 16, 2017, p. 1-p. 84.

Bojic et al., "Advanced wireless and optical technologies for small-cell mobile backhaul with dynamic software-defined management," IEEE Communications Magazine, Sep. 2013, pp. 86-93.

Namal et al., "SDN Based Inter-Technology Load Balancing Leveraged by Flow Admission Control," IEEE SDN for Future Networks and Services (SDN4FNS), Nov. 11-13, 2013, pp. 1-5.

Ben Hadj Said et al., "New control plane in 3GPP LTE/EPC architecture for on-demand connectivity service," IEEE 2nd International Conference on Cloud Networking (CloudNet), Nov. 11-13, 2013, pp. 205-209.

Qian et al., "Characterization of 3G Data-Plane Traffic and Application towards Centralized Control and Management for Software Defined Networking," IEEE International Congress on Big Data (BigData Congress), Jun. 27-Jul. 2, 2013, pp. 278-285.

Hampel et al., "Applying Software-Defined Networking to the telecom domain," 16th IEEE International Global Internet Symposium, Apr. 14-19, 2013, pp. 133-138.

Li et al., "Toward Software-Defined Cellular Networks," European Workshop on Software Defined Networking (EWSDN), Oct. 25-26, 2012, pp. 7-12.

* cited by examiner

CELL AND METHOD AND SYSTEM FOR BANDWIDTH MANAGEMENT OF BACKHAUL NETWORK OF CELL

CROSS-REFERENCE TO RELATED APPLICATION

This application claims the priority benefit of Taiwan application serial no. 104128094, filed on Aug. 27, 2015. The entirety of the above-mentioned patent application is hereby incorporated by reference herein and made a part of this specification.

TECHNICAL FIELD

The disclosure relates to a method and a system bandwidth management of a backhaul network of the cell.

BACKGROUND OF THE DISCLOSURE

Along with continuous development of wireless apparatuses and application software thereof, users are more dependent on mobile networks to watch video files and process massive data, and a data transmission capacity of the network has grown exponentially in just a few years. In order to provide consumers with a broader bandwidth, a better network transmission quality, telecom operators have to constantly look for solutions to cope with bandwidth requirements of the users in the future. Since the cells built in a convention large cell network system is not many, a backhaul network is relatively simple, which generally adopts a dedicated line to transmit information back to a core network. Compared to a small cell network system constructed by small cells, a wireless access technique of the large cell network system is slow in impact on a network capacity growth, and acquirement of frequency band involves a wide level and is laborious and time-consuming. Accordingly, the small cells are going to be built in large quantities in the future, and investment of industry funds and setting of subsequent supporting standards are all developed towards the trend of the small cell network system.

In order to provide a service quality assurance service in a telecommunication network, a $3^{rd}$ generation partnership project (3GPP) provides a novel quality of service (QoS) concept. In a long term evolution (LTE) radio network, traffic is adopted to differentiate, and multiple bearers are adopted in architecture, so as to determine a transmission sequence of each bearer according to different QoS class identifiers (QCI). Under the LTE environment, the establishment of bearers is controlled by telecom operators, for example, a mobility management entity (MME), and during the process of establishing the bearers, the MME gives the corresponding QCI value to each bearer, and the QCI value has the corresponding QoS. The QoS represents a transmission quality assurance of the bearers of an evolved packet system (EPS), and through the QCI mechanism, each of the bearers is assured to reach a bearer service quality required by a control plane, and is complied with a transfer delay of a user bearer.

A differentiated services code point (DSCP) is a bandwidth management mechanism of the current backhaul network, where the bandwidth management of a wireless terminal adopts the QCI mechanism, and when data is to be transmitted to the backhaul network, the cell encapsulates the data into general packet radio service (GPRS) tunnelling protocol-user (GTP-U) packets, and labels a DSCP code on a packet header of an outer layer to serve as an identification of a data flow.

However, when a plenty of small cells are constructed in the future, the backhaul network is no longer simple, and a network load is varied along with user's movement and is varied along with time and user's bandwidth requirement. The patterns and emerging positions of the data flow at daytime and the data flow at night time are all different. Since variation of the backhaul network is large, management complexity thereof is greatly increased, and since dynamic and real-time adjustment of the backhaul network is required, it is hard to perform a proper bandwidth management to achieve the QoS standard specified by the 3GPP.

In case that the backhaul network becomes more and more complicated, the current bandwidth management mechanism is hard to satisfy the demand of the 3GPP standard, and switches/routers on the backhaul network do not necessarily support the DSCP technique. Since the DSCP cannot support a maximum bit rate (MBR)/guaranteed bit rate (GBR), the current bandwidth management mechanism cannot provide a suitable bandwidth management function in response to the network load with large variability.

On the other hand, since the backhaul network does not involve in information exchange between the small cell and the core network, the backhaul network cannot get to learn bandwidth management information and setting established between the cell and a serving gateway (S-GW). If the bandwidth management is required, the backhaul network is required to analyse user packets encapsulated through the GPRS tunnelling protocol. In other words, the switches/routers are required to see through the GPRS tunnel in order to process different bearers according to information obtained after analysis. If the switches are required to have the packet analysis function, the cost thereof must be high.

SUMMARY OF THE DISCLOSURE

The disclosure is directed to a cell and a method and a system for bandwidth management of a backhaul network of the cell, which improve a bandwidth management capability and adaptability of the backhaul network of the small cell.

An embodiment in accordance with the disclosure provides a method for bandwidth management of a backhaul network of a cell, which is adapted for arranging a routing path of a bearer established between a user equipment and a serving gateway by the cell in the backhaul network. In the method, the cell connects the user equipment to establish the bearer between the user equipment and the serving gateway or change the established bearer. The cell sets a packet label on data packets of the bearer and transmits the packet label and bandwidth management information of the bearer to a controller of the backhaul network for the controller to arrange the routing path of the data packets using the packet label in the backhaul network according to the bandwidth management information, where the bandwidth management information includes a tunnel endpoint identifier (TEID), a quality of service (QoS) class identifier (QCI) of the bearer and a bandwidth requirement.

An embodiment in accordance with the disclosure provides a bandwidth management system of a backhaul network of a cell, which includes at least one cell, a plurality of network devices and a controller of the backhaul network. Each of the cells includes a wireless resource manager, a label manager and a bearer information notifier, where the wireless resource manager is configured to establish a bearer between a user equipment and a serving gateway. The label manager is configured to set a packet label on data packets of the bearer. The bearer information notifier is configured to obtain bandwidth management information of the bearer and transmit the packet label and the bandwidth management information of the bearer to the controller of the backhaul network, where the bandwidth management information includes a tunnel endpoint identifier (TEID), a quality of service (QoS) class identifier (QCI) of the bearer and a bandwidth requirement. The controller connects each of the cells, and includes a bearer information manager and a routing path manager, where the bearer information manager is configured to receive and manage the bandwidth management information transmitted by each of the cells, and the routing path manager arranges the routing path of the data packets using the packet label in the backhaul network according to the bandwidth management information of each of the cells.

An embodiment in accordance with the disclosure provides a cell including a wireless resource manager, a label manager and a bearer information notifier, where the wireless resource manager is configured to establish a bearer between a user equipment and a serving gateway. The label manager is configured to set a packet label on data packets of the bearer. The bearer information notifier is configured to obtain bandwidth management information of the bearer and transmit the packet label and the bandwidth management information of the bearer to a controller of a backhaul network, such that the controller accordingly arranges a routing path of the data packets using the packet label in a plurality of network devices in the backhaul network. The bandwidth management information includes a tunnel endpoint identifier (TEID), a quality of service (QoS) class identifier (QCI) of the bearer and a bandwidth requirement.

According to the above descriptions, in the cell and the method and the system for bandwidth management of the backhaul network of the cell of the disclosure, the small cell may assist the controller in the programmable network to identify a data flow without seeing through the packet content in the tunnel, and may implement functions such as dynamic bandwidth management.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In the disclosure, during an initial process when a small cell establishes a bearer for a user equipment (UE), the small cell sets a packet label for the bearer, and provides the packet label and information such as a QoS class identifier (QCI) of the bearer, a maximum bit rate (MBR), or a guaranteed bit rate (GBR), to a controller in a backhaul network, and the controller may set a routing behaviour of switches/routers in the backhaul network. In this way, when the small cell transmits data packets of the UE to the backhaul network, the switches/routers may learn a traffic characteristic of the data packets so as to perform corresponding processing as long as the switches/routers identify the packet label on the data packets.

Figure 1:
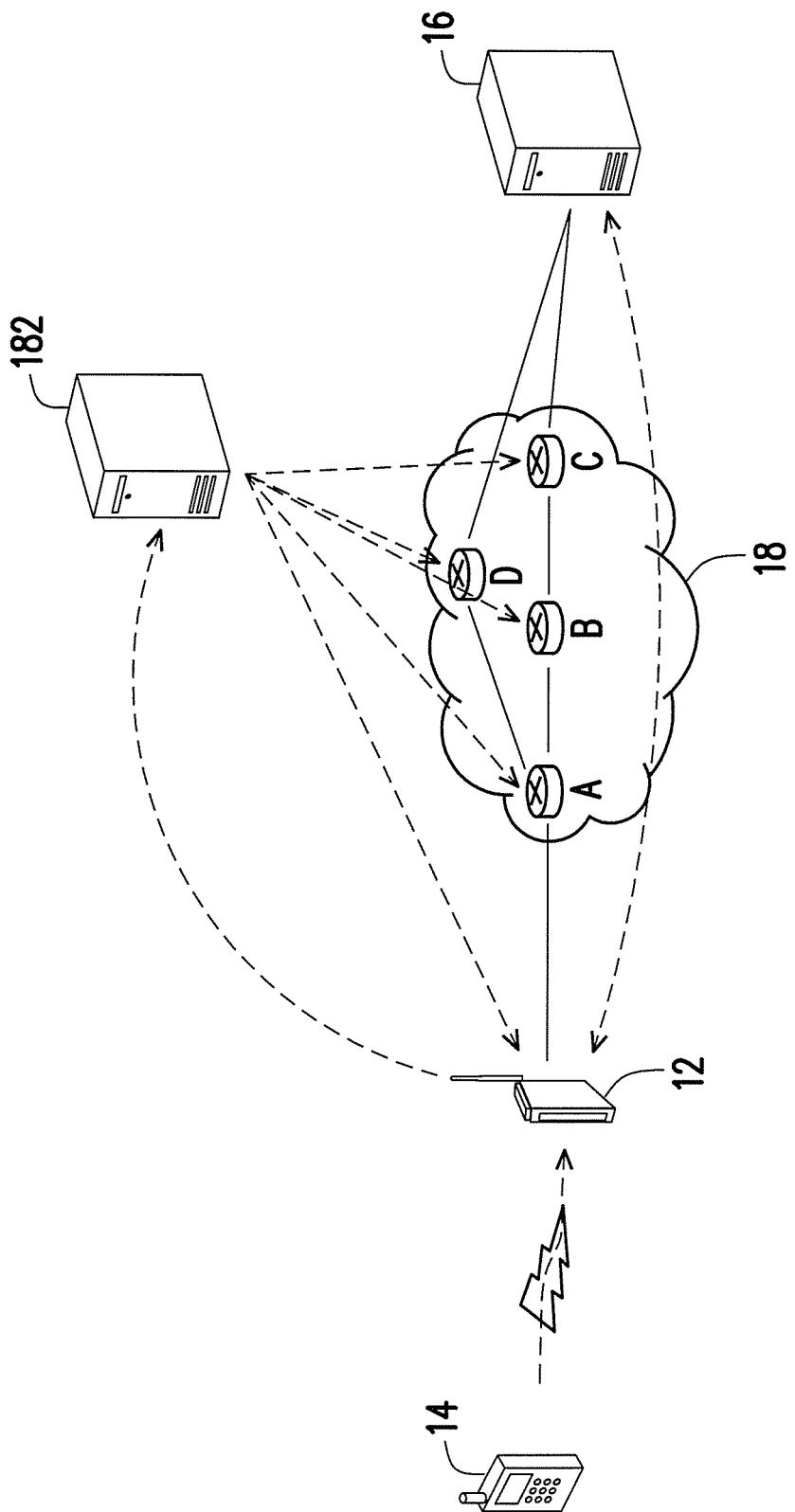
FIG. 1 is a schematic diagram of bandwidth management of a backhaul network of a cell according to an embodiment of the disclosure.

In detail, FIG. 1 is a schematic diagram of bandwidth management of a backhaul network of a cell according to an embodiment of the disclosure. Referring to FIG. 1, first, a small cell 12 supporting a long term evolution-advanced (LTE-A) technique establishes a bearer between a UE 14 and a serving gateway 16 thereof, and designs a packet label for such bearer. Then, the small cell 12 transmits the packet label and the MBR/GBR information and all of the QoS information of the bearer to a controller 182 in the backhaul network 18. The controller 182 then sets a routing behaviour of each of network devices (for example, switches or routers, and in the present embodiment, switches A-D are taken as an example for description) in the backhaul network 18 according to the information. In the programmable backhaul network 18, the controller 182 has all of the QoS information of the bearer, such that the controller 182 may identify the traffic without seeing through the tunnel, so as to perform dynamic traffic management on the data packets of the bearer. A range that the data packets receive the dynamic traffic management, for example, starts from an action that the small cell 12 sets the packet label till an action that a last switch (for example, the switches A, D) in front of the serving gateway 16 removes the packet label.

The aforementioned switches are, for example, tier 2 network switches of a tier 2 data link layer defined by an open system interconnection reference model (OSI model), which have functions of virtual local area network (VLAN) division, port auto-negotiation, MAC access control list, etc.; or tier 3 network switches supporting a tier 3 network layer protocol, which support a certain router function for connecting different network segments, and can establish a direct connection between two network segments by inquiring and learning from a default serving gateway; or tier 4 network switches supporting a tier 4 transmission layer protocol, which may connect a session with a concrete Internet protocol (IP) address to practise a virtual IP. Moreover, the aforementioned routers may support the tier 3 network layer defined by the OSI model or the protocol above the tier 3, which not only has the functions of the switch, but may also has a function of selecting an optimal path from a plurality of paths while taking the flow table as a basis for packet transmission.

Figure 2:
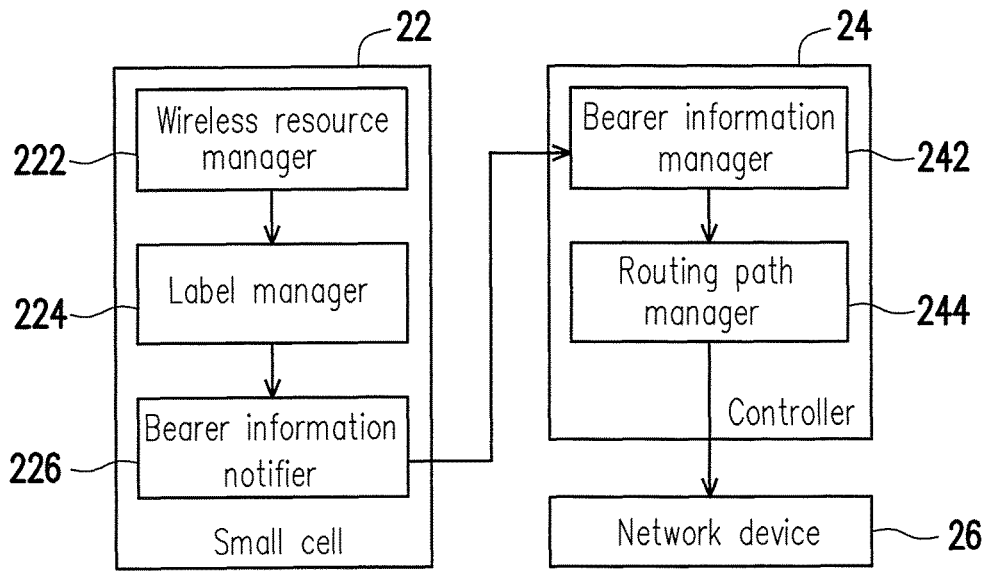
FIG. 2 is a block diagram of a bandwidth management system of a backhaul network of a cell according to an embodiment of the disclosure.

FIG. 2 is a block diagram of a bandwidth management system of a backhaul network of a cell according to an embodiment of the disclosure. Referring to FIG. 2, the bandwidth management system 20 of the backhaul network of the present embodiment adopts a programmable network, for example, a software-defined network (SDN), and includes at least one cell (in the present embodiment, a small cell 22 is taken as an example for description), a controller 24 and a plurality of network devices 26. Data transmission between the small cell 22 and the controller 24 and between the controller 24 and the network devices 26 is implemented through a wired or wireless network connection.

The small cell 22 is, for example, a low-power radio accessing equipment operated by a telecom operator under a licensed spectrum, and based on emission powers from small to large, the types of the small cell 22 may include a femtocell, a picocell and a microcell. The small cell 22 includes a wireless resource manager 222, a label manager 224 and a bearer information notifier 226, where the wireless resource manager 222 supports a radio resource management (RRM), and is configured to connect a UE (not shown) and establish a bearer between the UE and a serving gateway (not shown). The label manager 224 is in charge of managing a connection relationship between the bearer and a packet label, and is configured to set the packet label on data packets of the bearer established by the wireless resource manager 222 for the network device 26 in the backhaul network to identify the data packets. The label manager 224 can be independently configured or configured in the wireless resource manager 222, which is not limited by the present embodiment. The bearer information notifier 226 is configured to obtain bandwidth management information of the bearer and create a notification message for notifying the controller 24 in the backhaul network, where the bandwidth management information includes a tunnel endpoint identifier (TEID), a quality of service (QoS) class identifier (QCI) of the bearer and a bandwidth requirement such as MBR or GBR, and the controller 24 may manage the bandwidth of the backhaul network according to the bandwidth management information.

The controller 24 is, for example, a controller in charge of managing the network devices 26 in the programmable network. The controller 24 is implemented by software, plans the network in a central controlling manner, and sends commands to the network devices 26 for controlling a network traffic. The controller 24 includes a bearer information manager 242 and a routing path manager 244, where the bearer information manager 242 is configured to receive the bandwidth management information from the bearer information notifier 226 of the small cell 22, and manages the bandwidth management information of all of the cells. The routing path manager 224 arranges the routing path of the data packets using the aforementioned packet label in the backhaul network according to the bandwidth management information of each of the cells. It should be noted that the bearer information manager 242 is, for example, implemented by an application program installed in the controller 24, and works in coordination with the routing path manager 224 originally configured in the controller 24 to implement a method for bandwidth management of the embodiment of the disclosure.

Figure 3:
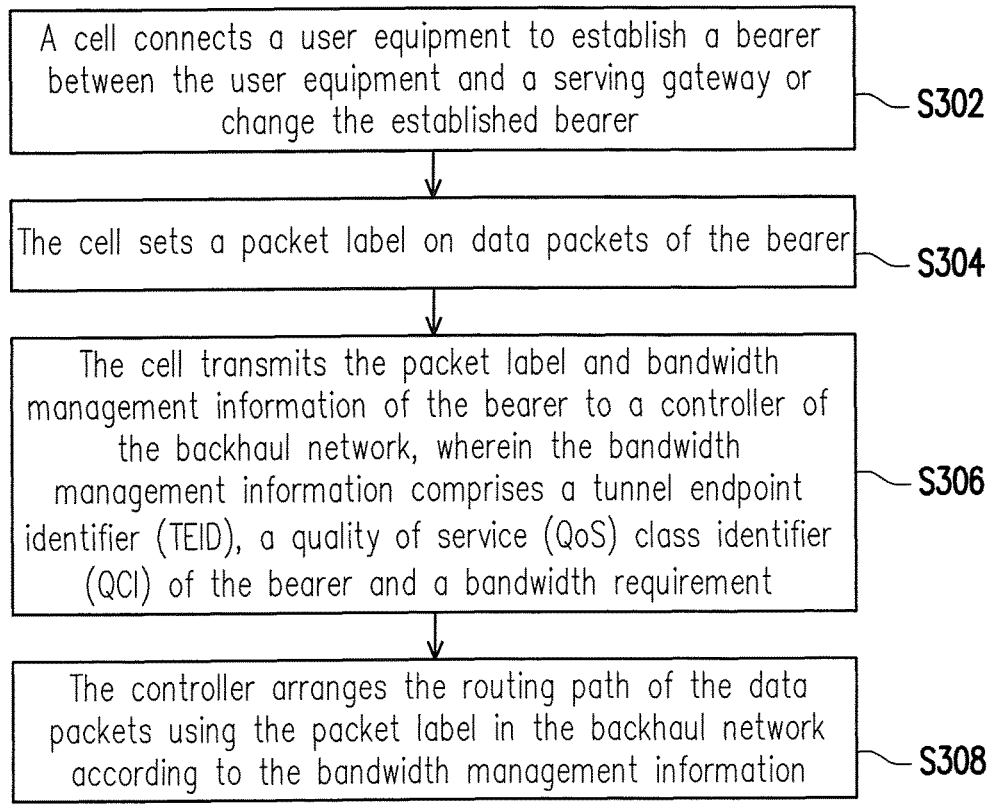
FIG. 3 is a flowchart illustrating a method for bandwidth management of a backhaul network of a cell according to an embodiment of the disclosure.

In detail, FIG. 3 is a flowchart illustrating a method for bandwidth management of a backhaul network of a cell according to an embodiment of the disclosure. Referring to FIG. 2 and FIG. 3, the method of the present embodiment is adapted to the aforementioned bandwidth management system 20. Detailed steps of the method of the present embodiment are described below with reference to various devices in the bandwidth management system 20 of FIG. 2.

First, when the UE is connected to the cell 22, the wireless resource manager 222 in the cell 22 establishes a bearer between the UE and the serving gateway or changes a previously established bearer (step S302). After the UE establishes the connection, the wireless resource manager 222 establishes a tunnel between the cell 22 and the serving gateway, and sets a TEID. Meanwhile, the wireless resource manager 222 sets a QCI of the bearer according to a service requirement of the UE.

Then, the label manager 224 assigns a packet label to the bearer, and sets the packet label on the data packets received from the UE (step S304). The label manager 224, for example, uses a virtual IP address as the packet label of the data packets, or sets a source port of the data packets to a specific value to serve as the packet label, or uses any other labelling method for labelling the data packets for identification, which is not limited by the embodiment.

In the embodiment of setting the source port, after the wireless resource manager 222 encapsulates the data packets of the bearer as GPRS tunnelling protocol-user (GTP-U) packets, the label manager 224, for example, sets a source port of the GTP-U packets to a specific value, for example, 1001 or other value according to the TEID, which is not limited by the disclosure.

On the other hand, in the embodiment of using the virtual IP address, the label manager 224 may configure the virtual IP address by adopting a centralized or distributed configuration method. In the centralized configuration method, the controller 22 may configure an IP address section to the cell 22 according to the number of the cells and the traffic in the backhaul network, and the label manager 224 of the cell 22 allocates a virtual IP address in the IP address section to serve as the packet label of the bearer. Moreover, in the distributed configuration method, the label manager 224 of the cell 22 may directly calculate the aforementioned IP address section according to its own IP address, and allocates a virtual IP address in the IP address section to serve as the packet label of the bearer.

Then, the bearer information notifier 226 transmits the packet label and the bandwidth management information of the bearer to the controller 24 of the backhaul network (step S306) for the routing path manager 244 of the controller 24 to arrange the routing path of the data packets using the packet label in the backhaul network according to the bandwidth management information in the bearer information manager 242 (step S308), where the bandwidth management information includes a TEID, a QCI of the bearer and a bandwidth requirement, for example, a downlink (DL) bandwidth and an uplink (UL) bandwidth of the MBR, and a DL bandwidth and an UL bandwidth of the GBR.

The routing path manager 244, for example, executes a dynamic bandwidth management to the backhaul network to determine the routing path according to the QCI and the bandwidth requirement in the bandwidth management information. The routing path passes through at least one network device 26 in the backhaul network.

After the routing path is determined, the routing path manager 244 connects the network devices 26 on the routing path, and sets a flow table on the network devices 26, such that when each of the network devices 26 receives the data packets using the aforementioned packet label, the network device 26 automatically transmits the data packets to a next network device recorded in the flow table.

Therefore, by using the small cell 22 to actively provide the controller 24 with the information required for executing the bandwidth management, the controller 24 may opportunely perform routing adjustment to the data packets sent to the backhaul network without performing complicated traffic identification, and the network devices 26 in the backhaul network are unnecessary to support seeing through the GPRS tunnel. Therefore, the method of the present embodiment may effectively reduce a construction cost of the backhaul network.

It should be noted that after the routing path manager 244 decides the routing path, the routing path manager 244, for example, further sets a last network device 26 (i.e. the last network device before reaching the serving gateway) on the routing path, such that when the network device 26 receives the data packets using the aforementioned packet label, the network device 26 modifies the packet label of the data packets to a standard value.

Figure 4:
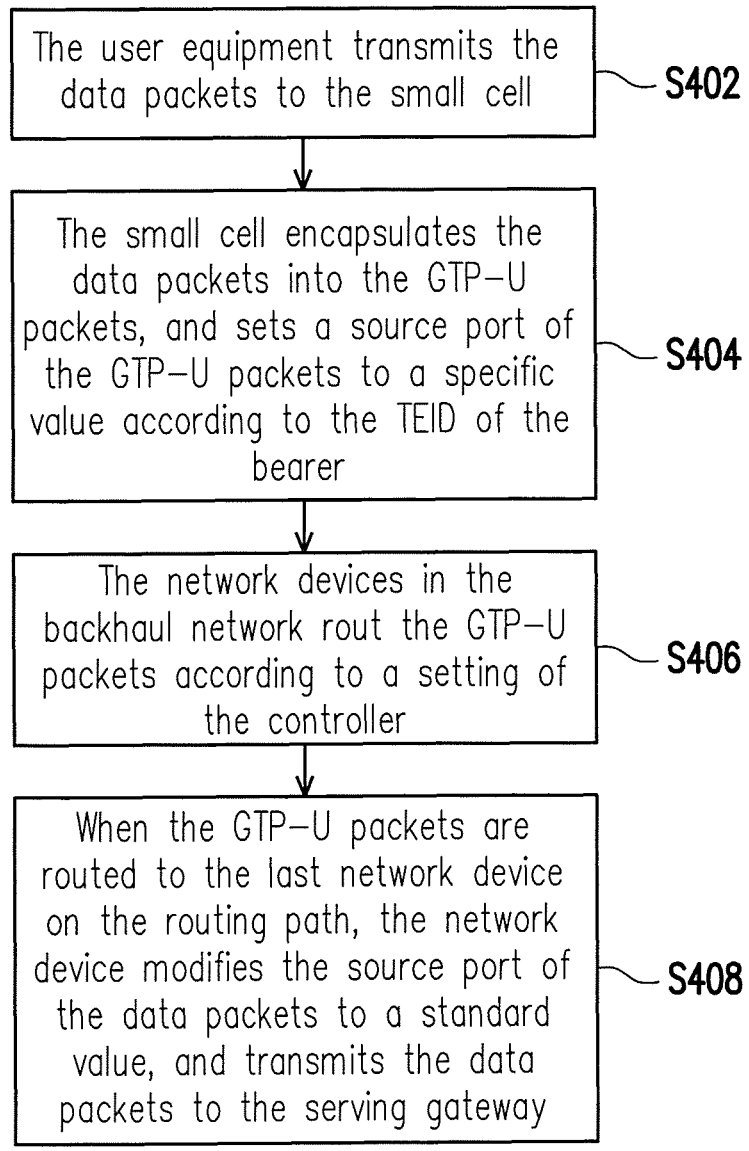
FIG. 4 is a flowchart illustrating a method for processing and routing data packets according to an embodiment of the disclosure.

In detail, FIG. 4 is a flowchart illustrating a method for processing and routing data packets according to an embodiment of the disclosure. Referring to FIG. 2 and FIG. 4, the method of the present embodiment is adapted to the aforementioned bandwidth management system 20. Detailed steps of the method of the present embodiment are described below with reference to various devices in the bandwidth management system 20 of FIG. 2.

First, the UE transmits the data packets to the small cell 22 (step S402), and the small cell 22 encapsulates the data packets into the GTP-U packets and sets a source port of the GTP-U packets to a specific value according to the TEID of the bearer (step S404).

The set GTP-U packets are then sent to the backhaul network by the small cell 22, and the network devices 26 in the backhaul network route the GTP-U packets according to a setting of the controller 24 (step S406).

When the GTP-U packets are routed to the last network device 26 (i.e. the last network device before reaching the serving gateway) on the routing path, the network device 26 modifies the source port of the data packets to a standard value, and transmits the data packets to the serving gateway (step S408). In this way, when the data packets are sent to the serving gateway, the serving gateway does not know that the source port of the data packets has ever been modified, which represents that the method of the present embodiment can be implemented without modifying the serving gateway.

Figure 5:
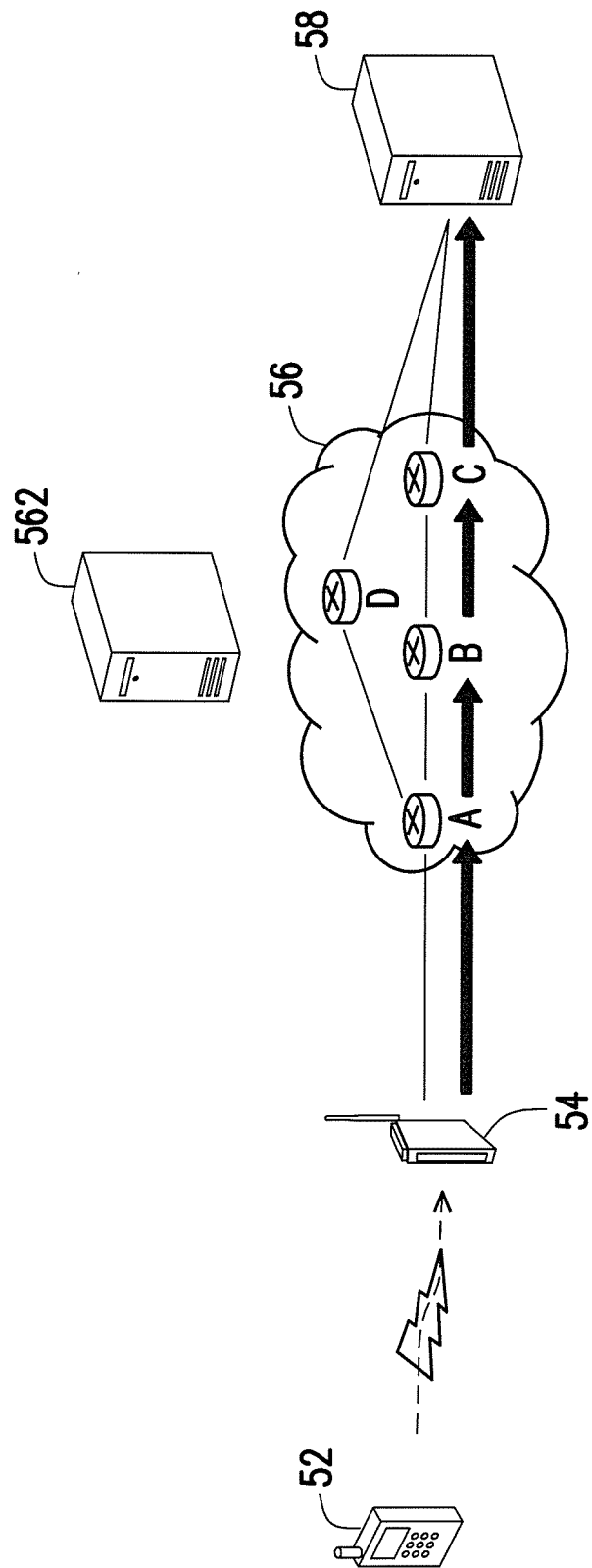
FIG. 5 is an example for processing and routing data packets according to an embodiment of the disclosure.

For example, FIG. 5 is an example for processing and routing data packets according to an embodiment of the disclosure. Referring to FIG. 5, first, when a UE 52 is connected to a small cell 54, the small cell 54 establishes a bearer between the UE 52 and a serving gateway 58. The small cell 54, for example, provides the bandwidth management information obtained when the small cell 54 establishes the bearer to a controller 562 of a backhaul network 56. As shown in a following table 1, the bandwidth management information includes: a TEID (i.e. 156) of the tunnel established between the small cell 54 and the serving gateway 58, a QCI (i.e. 4), a DL bandwidth of the MBR (i.e. 20 Mbps), an UL bandwidth of the MBR (i.e. 2 Mbps), and a DL bandwidth of the GBR (i.e. 2 Mbps), and an UL bandwidth of the GBR (i.e. 1 Mbps). Moreover, the small cell 54 further encapsulates the data packets transmitted by the UE 52 into the GTP-U packets, and sets the source port of the GTP-U packets to 1001 according to the TEID of the bearer.

TABLE 1

| TEID | QCI | MBR DL | MBR UL | GBR DL | GBR UL | Source port |
|---|---|---|---|---|---|---|
| 156 | 4 | 20 Mbps | 2 Mbps | 2 Mbps | 1 Mbps | 1001 |

The controller 562 executes bandwidth management to the backhaul network 56 according to the aforementioned bandwidth management information, so as to decide the routing path of the GTP-U packets, and the finally decided routing path is the small cell 54→a switch A→a switch B→a switch C→the serving gateway 58, as shown in FIG. 5. The controller 562 sets a flow table (as shown in table 2 below) of the switches A, B, C according to the routing path.

TABLE 2

| Switch | Source IP address | Source port | Action |
|---|---|---|---|
| A | 140.96.101.100 | 1001 | Enqueue = port_to_B:queue01 |
| B | 140.96.101.100 | 1001 | Enqueue = port_to_C:queue01 |
| C | 140.96.101.100 | 1001 | Modify the source port=2152 Output = to port_to_S-GW |

According to the above setting, when the switches A, B, C discover that the source port of the data packets is 1001, the switches A, B, C transmit the data packets to the port of a next hop, and perform a bandwidth management action of "enqueue" before transmitting the data packets, so as to cope with a traffic limitation. Particularly, the actions performed in the last switch C (i.e. the next hot thereof is the serving gateway 58 serving as the endpoint) include: modify the source port of the GTP-U packets to the original standard port number 2152, and transmit the GTP-U packets to the serving gateway 58.

It should be noted that after the source port of the GTP-U packets is changed to the specific value (1001) at the small cell 54, the GTP-U packets may receive the dynamic bandwidth management of the controller 562 in the backhaul network 56 until the last switch C modifies the source port thereof to the standard value (2152), and when the GTP-U packets are finally sent to the serving gateway 58, the serving gateway 58 does not know that the source port of the GTP-U packets has ever been modified.

Figure 6:
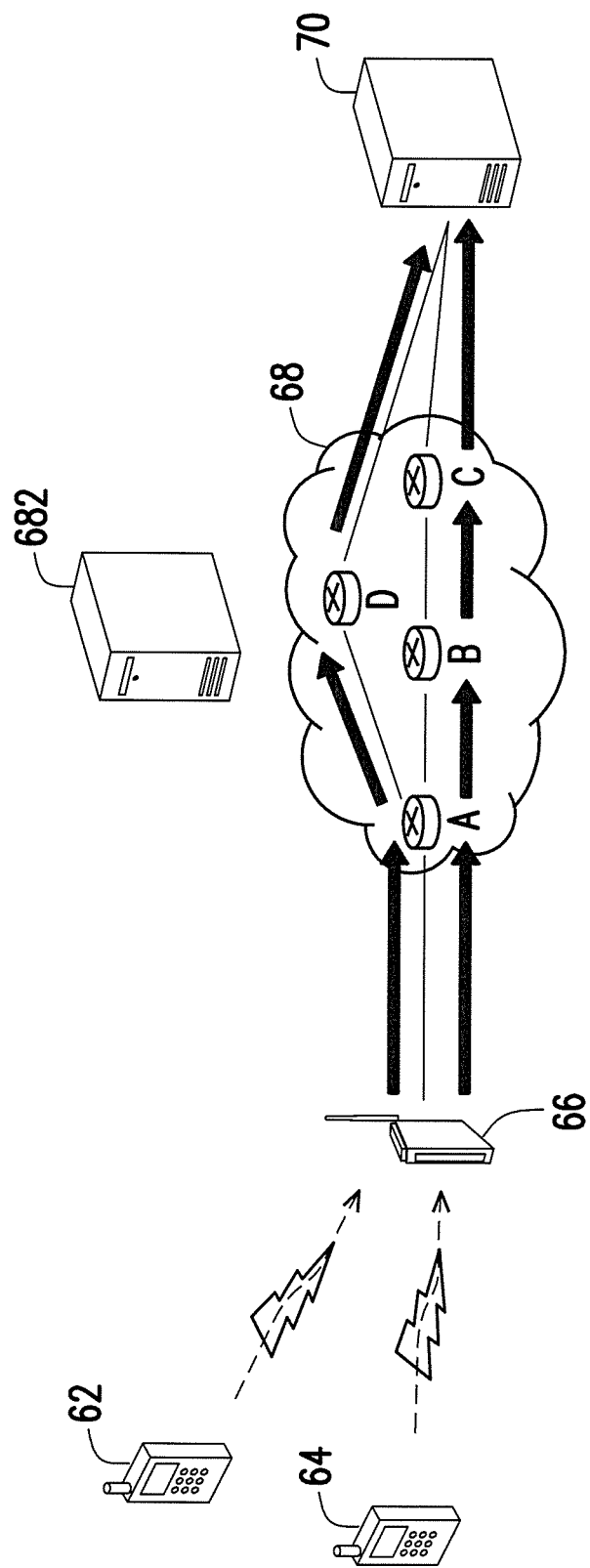
FIG. 6 is an example for processing and routing data packets according to an embodiment of the disclosure.

In the case that two UEs are connected, FIG. 6 is an example for processing and routing data packets according to an embodiment of the disclosure. Referring to FIG. 6, first, when UEs 62, 64 are connected to a small cell 66, the small cell 66 respectively establishes bearers between the UEs 62, 64 and a serving gateway 70. The small cell 66, for example, provides the bandwidth management information obtained when the small cell 66 establishes the bearers to a controller 682 of a backhaul network 68. As shown in a following table 3, the small cell 66 encapsulates the data packets transmitted by the UE 62 into the GTP-U packets, and sets the source port of the GTP-U packets to 1001 according to the TEID of the bearer. Meanwhile, the small cell 66 encapsulates the data packets transmitted by the UE 64 into the GTP-U packets, and sets the source port of the GTP-U packets to 3003 according to the TEID of the bearer.

TABLE 3

| TEID | QCI | MBR DL | MBR UL | GBR DL | GBR UL | Source port |
|------|-----|--------|--------|--------|--------|-------------|
| 156  | 4   | 9 Mbps | 2 Mbps | 2 Mbps | 1 Mbps | 1001        |
| 133  | 3   | 2 Mbps | 2 Mbps | 1 Mbps | 1 Mbps | 3003        |

The controller 682 executes bandwidth management to the backhaul network 68 according to the aforementioned bandwidth management information, so as to decide the routing path of the GTP-U packets, and the finally decided routing path of the GTP-U packets of the UE 62 is the small cell 66→the switch A→the switch D→the serving gateway 70, and the routing path of the GTP-U packets of the UE 64 is the small cell 66→the switch A→the switch B→the switch C→the serving gateway 70. Since the controller 682 determines that the traffic of the routing path (the switch→the switch B→the switch C) is excessively large, the GTP-U packets of the UE 62 are routed through another routing path (the switch A→the switch D→the serving gateway 70). Finally, the controller 682 sets a flow table (shown as a following table 4) of the switches A, B, C, D according to the routing paths.

TABLE 4

| Switch | Source network address | Source port | Action |
|--------|------------------------|-------------|--------|
| A      | 140.96.101.100         | 1001        | Enqueue = port_to_B:queue01 |
|        | 140.96.101.100         | 3003        | Enqueue = port_to_D:queue01 |
| B      | 140.96.101.100         | 1001        | Enqueue = port_to_C:queue01 |
| C      | 140.96.101.100         | 1001        | Modify source port=2152 |
|        |                        |             | Output = to port_to_S-GW |
| D      | 140.96.101.100         | 3003        | Modify source port=2152 |
|        |                        |             | Output = to port_to_S-GW |

Similar to the aforementioned embodiment, after the source port of the GTP-U packets of the UEs 62, 64 is changed to the specific value (1001 or 3003) at the small cell 66, the GTP-U packets may receive the dynamic bandwidth management of the controller 682 in the backhaul network 68 until the last switches C, D in the routing path modify the source port thereof to the standard value (2152), and then the GTP-U packets are sent to the serving gateway 70.

Figure 7:
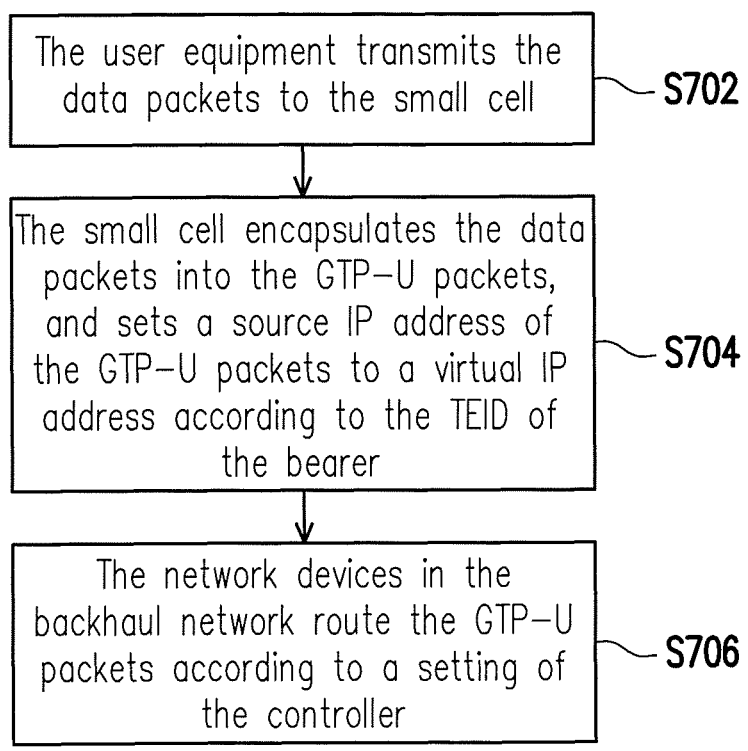
FIG. 7 is a flowchart illustrating a method for processing and routing data packets according to an embodiment of the disclosure.

On the other hand, in case that the virtual IP address is used to serve as the packet label, FIG. 7 is a flowchart illustrating a method for processing and routing data packets according to an embodiment of the disclosure. Referring to FIG. 2 and FIG. 7, the method of the present embodiment is adapted to the aforementioned bandwidth management system 20. Detailed steps of the method of the present embodiment are described below with reference to various devices of the bandwidth management system 20 of FIG. 2.

First, the UE transmits the data packets to the small cell 22 (step S702), and the small cell 22 encapsulates the data packets into the GTP-U packets, and sets a source IP address of the GTP-U packets to a virtual IP address according to the TEID of the bearer, and sets a destination IP address of the GTP-U packets to an IP address of the serving gateway (step S704). The set GTP-U packets are then sent to the backhaul network by the small cell 22, and the network devices 26 in the backhaul network route the GTP-U packets to the serving gateway according to a setting of the controller 24 (step S706).

It should be noted that after the small cell 22 decides the virtual IP address allocated to the bearer, the small cell 22, for example, reports a transport layer address of the GTP-U packets of the bearer to the serving gateway to serve as the aforementioned virtual IP address. In this way, when the serving gateway wants to transmit data back to the small cell 22, the serving gateway may encapsulate the transmitted data packets into the GTP-U packets, and sets the source IP address of the GTP-U packets as the IP address of the serving gateway, and sets the destination IP address of the GTP-U packets as the virtual IP address. The set GTP-U packets are then sent to the backhaul network by the serving gateway, and the network devices 26 in the backhaul network route the GTP-U packets to the small cell 22 according to the setting of the controller 24.

Figure 8:
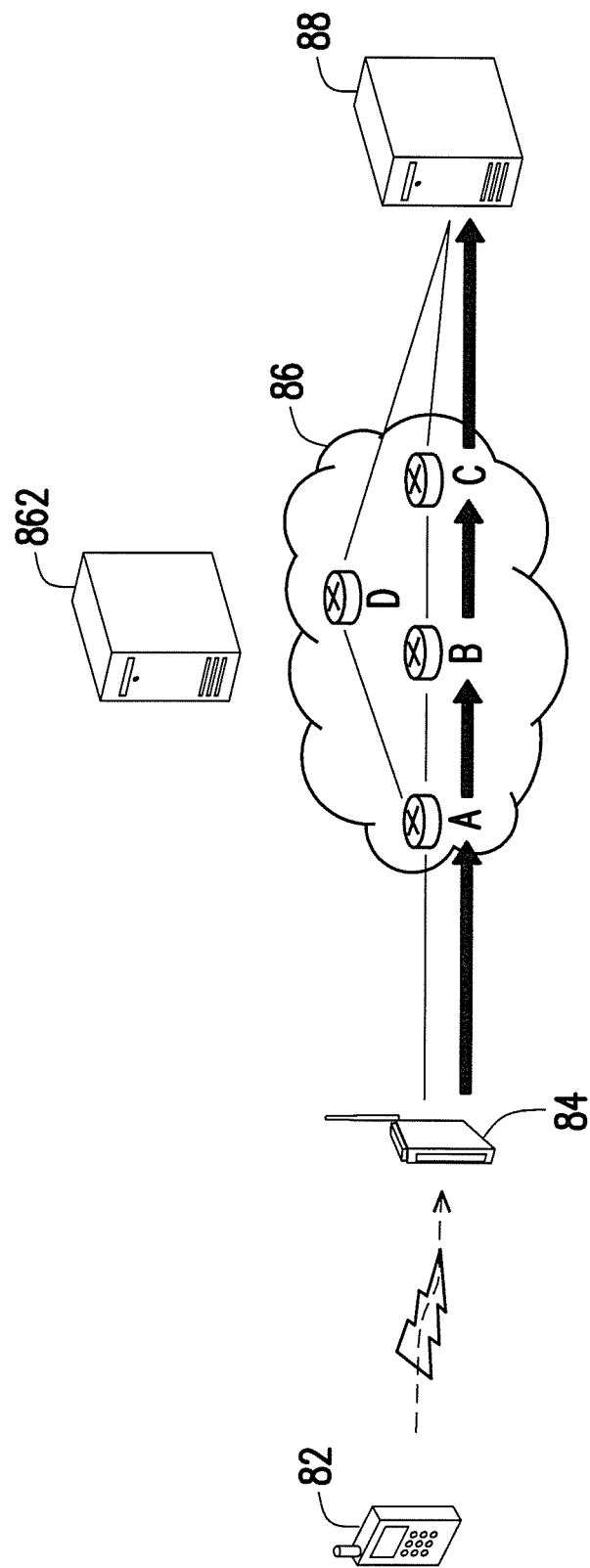
FIG. 8 is an example for processing and routing data packets according to an embodiment of the disclosure.
Figure 9:
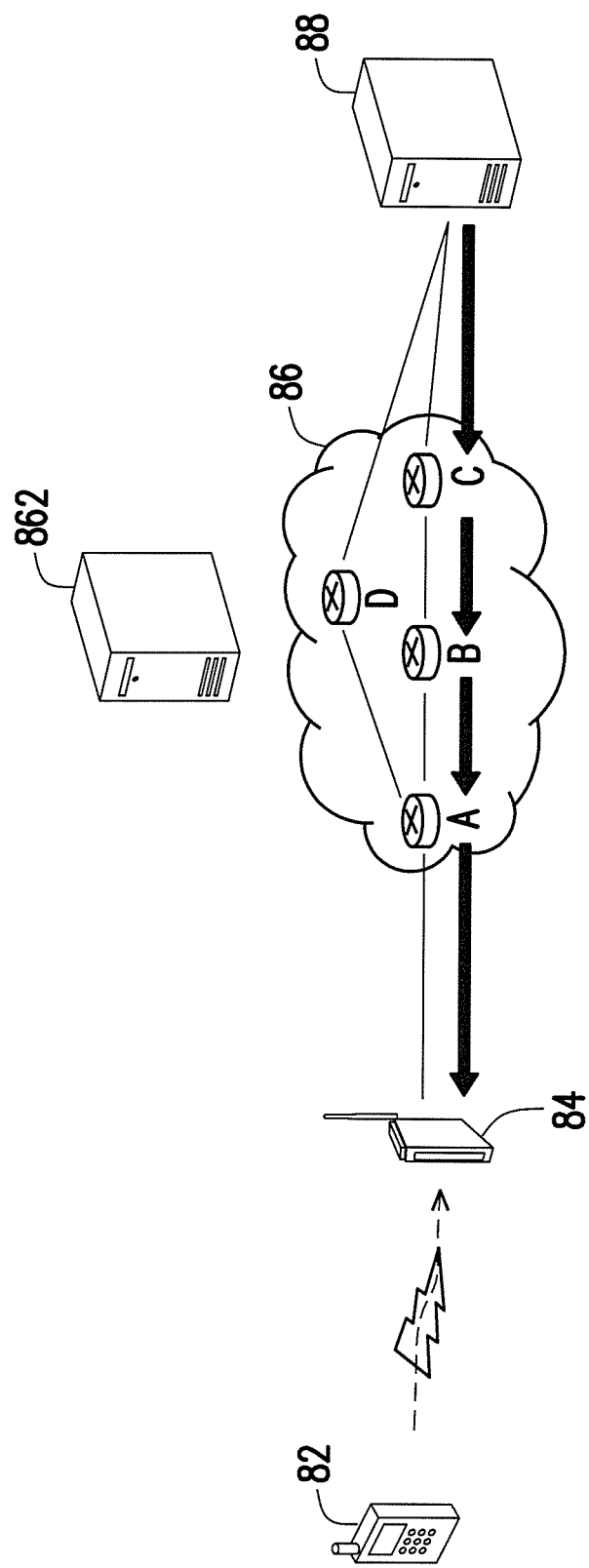
FIG. 9 is an example for processing and routing data packets according to an embodiment of the disclosure.

For example, FIG. 8 and FIG. 9 are examples for processing and routing data packets according to an embodiment of the disclosure. Referring to FIG. 8, first, when a UE 82 is connected to a small cell 84, the small cell 84 establishes a bearer between the UE 82 and a serving gateway 88. The small cell 84, for example, provides the bandwidth management information obtained when the small cell 84 establishes the bearer to a controller 862 of a backhaul network 86. As shown in a following table 5, the bandwidth management information includes: a TEID (i.e. 156) of the tunnel established between the small cell 84 and the serving gateway 88, a QCI (i.e. 4), a DL bandwidth of the MBR (i.e. 20 Mbps), an UL bandwidth of the MBR (i.e. 2 Mbps), and a DL bandwidth of the GBR (i.e. 2 Mbps), and an UL bandwidth of the GBR (i.e. 1 Mbps). Moreover, the small cell 84 further encapsulates the data packets transmitted by the UE 82 into the GTP-U packets, and sets the source IP address of the GTP-U packets to a virtual IP address (i.e. 192.168.101.3) according to the TEID of the bearer.

TABLE 5

| TEID | QCI | MBR DL  | MBR UL | GBR DL | GBR UL | Virtual IP     |
|------|-----|---------|--------|--------|--------|----------------|
| 156  | 4   | 20 Mbps | 2 Mbps | 2 Mbps | 1 Mbps | 192.168.101.3  |

The controller 862 executes bandwidth management to the backhaul network 86 according to the aforementioned bandwidth management information, so as to decide the routing path of the GTP-U packets, and the finally decided routing path is the small cell 84→the switch A→the switch B→the switch C→the serving gateway 88, as shown in FIG. 8. The controller 862 sets a flow table (as shown in table 6 below) of the switches A, B, C according to the routing path.

TABLE 6

| Switch | Source IP address | Action |
|--------|-------------------|--------|
| A      | 140.96.101.100    | Enqueue = port_to_B:queue01 |
| B      | 140.96.101.100    | Enqueue = port_to_C:queue01 |
| C      | 140.96.101.100    | Enqueue = port_to_S-GW:queue01 |

According to the above setting, when the switches A, B, C discover that the source IP address of the GTP-U packets is the virtual IP address, the switches A, B, C transmit the GTP-U packets to the port of a next hop, and perform a bandwidth management action of "enqueue" before transmitting the GTP-U packets, so as to cope with a traffic limitation. Finally, the GTP-U packets are transmitted to the serving gateway 88.

On the other hand, when the serving gateway 88 wants to transmit dada back to the small cell 84, the serving gateway 88 may encapsulate the transmitted data packets into the GTP-U packets, and sets the source IP address of the GTP-U packets as the IP address of the serving gateway 88, and sets the destination IP address of the GTP-U packets as the virtual IP address. The controller 862 executes bandwidth management to the backhaul network 86 according to the aforementioned bandwidth management information, so as to decide the routing path of the GTP-U packets, and the finally decided routing path is the serving gateway 88→the switch C→the switch B→the switch A→the small cell 84, as shown in FIG. 9. The controller 862 sets a flow table (as shown in table 7 below) of the switches A, B, C according to the routing path.

TABLE 7

| Switch | Destination IP address | Action |
|---|---|---|
| A | 140.96.101.100 | Enqueue = port_to_SC:queue01 |
| B | 140.96.101.100 | Enqueue = port_to_A:queue01 |
| C | 140.96.101.100 | Enqueue = port_to_B:queue01 |

According to the above setting, when the switches A, B, C discover that the destination IP address of the GTP-U packets is the virtual IP address, the switches A, B, C transmit the GTP-U packets to the port of a next hop, and perform the bandwidth management action of "enqueue" before transmitting the GTP-U packets, so as to cope with a traffic limitation. Finally, the GTP-U packets are transmitted to the small cell 84.

In summary, in the cell and the method and the system for bandwidth management of the backhaul network of the cell of the disclosure, the small cell labels the data packets, and assists the programmable network in identifying a data flow. In this way, the controller in the programmable network may identify a data flow without seeing through the packet content in the tunnel, and may implement dynamic bandwidth management, so as to reduce a construction cost of the backhaul network.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for bandwidth management of a backhaul network of a cell, adapted for arranging a routing path of a bearer established between a user equipment and a serving gateway by the cell in the backhaul network, the method comprising:
connecting the user equipment by the cell to establish the bearer between the user equipment and the serving gateway or change the established bearer;
setting, by the cell, a packet label on data packets transmitted or received by the bearer, wherein the packet label represents an identification of the data packets; and
transmitting the packet label and bandwidth management information of the bearer to a controller of the backhaul network by the cell for the controller to arrange the routing path of the data packets using the packet label in the backhaul network according to the bandwidth management information, wherein the bandwidth management information comprises a tunnel endpoint identifier (TEID), a quality of service (QoS) class identifier (QCI) of the bearer and a bandwidth requirement.

2. The method for bandwidth management of the backhaul network of the cell as claimed in claim 1, wherein in the step of setting, by the cell, the packet label on the data packets transmitted or received by the bearer, the method further comprises:
receiving an Internet protocol (IP) address section configured by the controller by the cell; and
allocating a virtual IP address in the IP address section by the cell to serve as the packet label of the bearer.

3. The method for bandwidth management of the backhaul network of the cell as claimed in claim 1, wherein in the step of setting, by the cell, the packet label on the data packets transmitted or received by the bearer, the method further comprises:
calculating an IP address section by the cell according to an IP address of the cell itself; and
allocating a virtual IP address in the IP address section by the cell to serve as the packet label of the bearer.

4. The method for bandwidth management of the backhaul network of the cell as claimed in claim 1, wherein the step of setting, by the cell, the packet label on the data packets transmitted or received by the bearer comprises:
encapsulating the data packets transmitted or received by the bearer into general packet radio service (GPRS) tunneling protocol-user (GTP-U) packets by the cell, and setting a source port of the GTP-U packets according to the TEID.

5. The method for bandwidth management of the backhaul network of the cell as claimed in claim 1, wherein the step of arranging the routing path of the data packets using the packet label in the backhaul network by the controller according to the bandwidth management information comprises:
executing dynamic bandwidth management to the backhaul network by the controller to decide the routing path according to the QCI and the bandwidth requirement in the bandwidth management information, wherein the routing path passes through a plurality of network devices; and
setting a flow table of each of the network devices on the routing path by the controller to enable each of the plurality of network devices to transmit the data packets to a next network device recorded in the flow table when receiving the data packets using the packet label.

6. The method for bandwidth management of the backhaul network of the cell as claimed in claim 5, wherein the step of arranging the routing path of the data packets using the packet label in the backhaul network by the controller according to the bandwidth management information further comprises:
setting a last network device on the routing path before reaching the serving gateway to enable the last network device to modify the packet label of the data packets to an standard value when receiving the data packets using the packet label.

7. The method for bandwidth management of the backhaul network of the cell as claimed in claim 5, wherein the plurality of network devices support tier 2 switches or switches above tier 2 defined by an open system interconnection reference model (OSI model), or supports tier 3 routers or routers above tier 3 defined by the OSI model.

8. A bandwidth management system of a backhaul network of a cell, comprising:
at least one cell, each cell comprising a processor configured to:
establish a bearer between a user equipment and a serving gateway;

set a packet label on data packets transmitted or received by the bearer, wherein the packet label represents an identification of the data packets; and obtain bandwidth management information of the bearer, and transmit the packet label and the bandwidth management information of the bearer to a controller of the backhaul network, wherein the bandwidth management information comprises a TEID, a QCI of the bearer and a bandwidth requirement;

a plurality of network devices; and a controller being configured to connect each of the cells and each of the plurality of network devices, and comprising configured to:

receive and manage the bandwidth management information transmitted by each of the cells; and arrange a routing path of the data packets using the packet label in the backhaul network according to the bandwidth management information of each of the cells.

9. The bandwidth management system of the backhaul network of the cell as claimed in claim 8, wherein the processor further receives an IP address section configured by the controller, and allocates one virtual IP address in the IP address section to serve as the packet label of the bearer.

10. The bandwidth management system of the backhaul network of the cell as claimed in claim 8, wherein the processor further calculates an IP address section according to an IP address of the cell itself, and allocates a virtual IP address in the IP address section to serve as the packet label of the bearer.

11. The bandwidth management system of the backhaul network of the cell as claimed in claim 8, wherein the processor encapsulates the data packets transmitted or received by the bearer into GTP-U packets, and sets a source port of the GTP-U packets according to the TEID.

12. The bandwidth management system of the backhaul network of the cell as claimed in claim 8, wherein the controller executes dynamic bandwidth management to the backhaul network to decide the routing path according to the QCI and the bandwidth requirement in the bandwidth management information, wherein the routing path passes through the plurality of network devices, and sets a flow table of each of the plurality of network devices on the routing path to enable each of the plurality of network devices to transmit the data packets to a next network device recorded in the flow table when receiving the data packets using the packet label.

13. The bandwidth management system of the backhaul network of the cell as claimed in claim 12, wherein the controller further sets a last network device on the routing path before reaching the serving gateway to enable the last network device to modify the packet label of the data packets to a standard value when receiving the data packets using the packet label.

14. The bandwidth management system of the backhaul network of the cell as claimed in claim 12, wherein the plurality of network devices support tier 2 switches or switches above tier 2 defined by an OSI model, or supports tier 3 routers or routers above tier 3 defined by the OSI model.

15. A cell, comprising:

a radio transceiver, configured to connect to a user equipment; and a processor, configured to:

establish a bearer between the user equipment and a serving gateway by using the radio transceiver;

set a packet label on data packets of the bearer, wherein the packet label represents and identification of the data packets; and obtain bandwidth management information of the bearer, and transmit the packet label and the bandwidth management information of the bearer to a controller of a backhaul network, to enable the controller to accordingly arrange a routing path of the data packets using the packet label in a plurality of network devices in the backhaul network, wherein the bandwidth management information comprises a TEID, a QCI of the bearer and a bandwidth requirement.

16. The cell as claimed in claim 15, wherein the processor further receives an IP address section configured by the controller, and allocates one virtual IP address in the IP address section to serve as the packet label of the bearer.

17. The cell as claimed in claim 15, wherein the processor further calculates an IP address section according to an IP address of the cell itself, and allocates a virtual IP address in the IP address section to serve as the packet label of the bearer.

18. The cell as claimed in claim 15, wherein the processor encapsulates the data packets of the bearer into GTP-U packets, and sets a source port of the GTP-U packets to a specific value according to the TEID.

19. The cell as claimed in claim 15, wherein the controller further sets a last network device on the routing path before reaching the serving gateway, to enable the last network device to modify the packet label of the data packets to a standard value when receiving the data packets using the packet label.

20. The cell as claimed in claim 15, wherein the plurality of network devices support tier 2 switches or switches above tier 2 defined by an OSI model, or supports tier 3 routers or routers above tier 3 defined by the OSI model.

* * * * *